United States Patent
Reemtsma

(10) Patent No.: US 7,280,845 B2
(45) Date of Patent: Oct. 9, 2007

(54) METHOD FOR SIMPLIFYING THE EXCHANGE OF A SIM CARD OF SUBSCRIBERS OF A DIGITAL MOBILE COMMUNICATIONS NETWORK

(75) Inventor: Jan-Hinnerk Reemtsma, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 458 days.

(21) Appl. No.: 10/344,313

(22) PCT Filed: Aug. 9, 2001

(86) PCT No.: PCT/DE01/02953

§ 371 (c)(1),
(2), (4) Date: Jul. 3, 2003

(87) PCT Pub. No.: WO02/13564

PCT Pub. Date: Feb. 14, 2002

(65) Prior Publication Data

US 2005/0075137 A1    Apr. 7, 2005

(30) Foreign Application Priority Data

Aug. 10, 2000 (DE) ............... 100 39 861

(51) Int. Cl.
*H04M 3/00* (2006.01)
*H04M 1/00* (2006.01)
*H04M 3/42* (2006.01)
*H04M 9/00* (2006.01)
*H04B 1/38* (2006.01)

(52) U.S. Cl. .............. 455/558; 455/418; 455/419; 379/211.05; 379/357.01; 379/433.09

(58) Field of Classification Search ............... 455/558, 455/466, 418, 419; 379/211.05, 357.01, 379/433.09
See application file for complete search history.

(56) References Cited

U.S. PATENT DOCUMENTS

| | | | |
|---|---|---|---|
| 5,657,373 A | | 8/1997 | Hermansson et al. |
| 5,898,783 A | * | 4/1999 | Rohrbach .................. 340/5.31 |
| 6,119,020 A | * | 9/2000 | Miller et al. ................ 455/558 |
| 6,285,869 B1 | * | 9/2001 | Shannon et al. ............ 455/411 |
| 6,405,369 B1 | * | 6/2002 | Tsuria ............................ 725/6 |
| 6,484,024 B1 | * | 11/2002 | Darnault et al. ............ 455/418 |
| 6,484,026 B1 | | 11/2002 | Hägebarth |
| 6,591,098 B1 | * | 7/2003 | Shieh et al. ................. 455/419 |
| 6,859,650 B1 | * | 2/2005 | Ritter .......................... 455/406 |
| 2002/0029348 A1 | * | 3/2002 | Du et al. ..................... 713/193 |

FOREIGN PATENT DOCUMENTS

| | | |
|---|---|---|
| CA | 2318293 | 7/1999 |
| DE | 198 01 576 A1 | 1/1998 |
| EP | 1 009 181 A1 | 6/2000 |
| GB | 2 304 257 A | 6/1995 |
| WO | PCT/SE93/00784 | 9/1993 |
| WO | PCT/US96/10742 | 6/1996 |
| WO | PCT/CH98/00076 | 2/1998 |
| WO | PCT/FI98/00522 | 6/1998 |

* cited by examiner

*Primary Examiner*—Nay Maung
*Assistant Examiner*—Andrew Wendell
(74) *Attorney, Agent, or Firm*—Lackenbach Siegel, LLP; Myron Greenspan

(57) ABSTRACT

With the present method for simplifying the exchange of a SIM card of subscribers of a digital mobile communications network, the subscriber disposes of an old active SIM card and makes us of a new inactive SIM card in a mobile terminal. The invention provides that the proper activation of the new SIM card and deactivation of the old SIM are carried out while in dialog with subscribers via a migration server connected to the mobile communication network.

7 Claims, 1 Drawing Sheet

Figure 1:
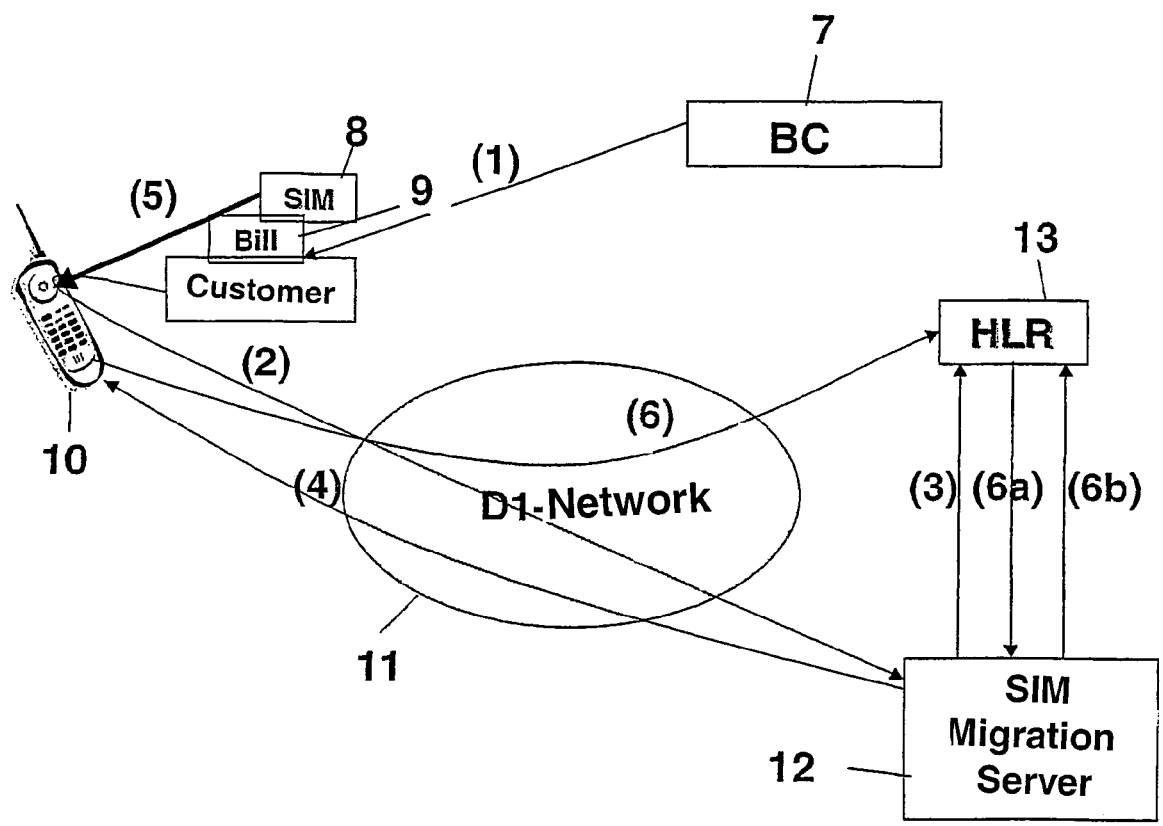

METHOD FOR SIMPLIFYING THE EXCHANGE OF A SIM CARD OF SUBSCRIBERS OF A DIGITAL MOBILE COMMUNICATIONS NETWORK

CROSS-REFERENCE TO RELATED APPLICATIONS

This application is a national phase application of International Application No. PCT/DE01/02953 filed on Aug. 9, 2001, and claims priority of German Patent Application No. 100 39 861.8 filed on Aug. 10, 2000.

The invention relates to a method for the simplified exchange of an SIM card at the subscribers of a digital mobile communication network.

During the introduction of new mobile radio products and mobile radio services by a mobile radio provider, it is often helpful or even required to replace the subscriber identity module (SIM card) in the case of existing clients. With a client base of several million subscribers this represents a considerable problem of logistics, since it is necessary to ensure that each subscriber receives his personalized SIM card and only one card per subscriber, i.e. either the "old" or the "new", is activated.

Up to now there is no known method which permits the simple exchange of the SIM card in mobile communication networks. To prevent misuse, it is necessary that the client either personally picks up his new card at the mobile radio provider's location or exchanges the old card against a new one or, after having received the card by mail, confirms its receipt in writing. The old card can subsequently be deactivated and the new one can be activated. In contrast to bank cards, it is absolutely necessary to prevent that both cards are simultaneously active in the mobile communication network. The process employed up to now is manual and, due to the costs incurred, unsuitable for the mass migration of existing customers.

The invention addresses the problem of proposing a method for the simplified exchange of an SIM card at the subscribers of a digital mobile communication network, which requires minimum logistics expenditures for the network operator as well as also the subscriber.

This problem is solved according to the invention through the characteristics of patent claim 1.

The invention provides that the correct activation of the new SIM card and the deactivation of the old SIM card is carried out in dialog with the subscriber through a migration server connected to the mobile communication network. In a preferred procedural approach the transmission takes place of a message with given content from the mobile terminal device to the migration server utilizing the old SIM card; activation of the new SIM card through the migration server; notification of the subscriber, preferably via the mobile terminal device, that the new SIM card can be exchanged against the old one; the exchange of the SIM card in the mobile terminal device by the subscriber; and the deactivation of the old SIM card by the migration server as soon as the subscriber initially logs into the mobile communication network with the new SIM card.

The advantages of the method according to the invention are obvious.

It involves an automated process

Misuse of the SIM cards is virtually excluded

Subscribers can determine themselves when switching to the new card is to take place Mass market migration becomes possible From the point of view of the subscriber the method is simple, i.e. a low level of customer service support is to be expected A "sliding" migration is possible, which means peak loads in the network and the customer administration can be avoided The proposed server solution is scalable The proposed server solution minimizes expenditures in the network.

In order to ensure that the subscriber has received his personalized new SIM card, he must confirm with certainty the receipt of the new SIM card. The exchange of the message between mobile terminal device and migration server preferably takes place by means of short messages (SMS). However, other methods can also be employed, such as for example e-mail, voice input etc. A further advantage of the invention is that the exchange of the SIM cards can occur at a point in time which is freely selectable by the subscriber. Only after the change of the SIM cards and the initial log-in into the mobile communication network is the old card deactivated.

It can moreover be provided that the migration server queries personal data of the subscriber residing on the old SIM card, intermediately stores them and transfers them onto the new SIM card during the initial log-in with this new card. These personal data can, for example, be the electronic telephone book of the subscriber. During the initial log-in with the new SIM card, the subscriber can preferably via his terminal device be informed with respect to the procedure to follow with the old SIM card.

In the following in conjunction with FIG. 1 of the drawing the method according to the invention and the tasks of the SIM card migration server will be explained more precisely. Based on the drawing and its description further characteristics and advantages of the invention are evident.

Step 1 of the method:

The new SIM card 8 already personalized but not yet enabled in the mobile communication network 11 is sent to the subscriber 10 for example together with the monthly billing statement 9 by the billing center 7. In the same mail (packet) the subscriber 10 receives detailed information regarding the additional features accessible to him with his new SIM card 8. He is further informed that he must confirm receipt of the SIM card 8 by means of, for example, an SMS at a freely selectable point in time.

Step 2 of the method:

With his old SIM card in the terminal device, the subscriber 10 sends an SMS or the like with predetermined content, for example "Acknowledge Receipt SIM" to the SIM card migration server 12 connected to the mobile communication network 11.

Step 3 of the method:

The SIM card migration server 12 activates the new SIM card 8 in network 11, i.e. the new SIM card is enabled and thereby recognized and accepted during the log-in from the mobile communication network. Now the migration server 12 can also optionally query and store data stored by the subscriber 10 on the old card, such as the telephone book.

[sic: Step 4 of the method:]

The SIM card migration server 12 informs the subscriber that starting forthwith he can exchange the SIM card 8.

Step 5 of the method:

The subscriber 10 exchanges the SIM card 8 in his terminal device.

Step 6 of the method:

As soon as the subscriber 10 logs into the network 11 for the first time using his new SIM card 8, the HLR (home location register) 13 informs the SIM card migration server 12 (Step 6a), which thereupon deactivates the old SIM card (Step 6b). The notification of the server 12 can optionally also take place from the terminal device 10 for example via an SIM toolkit application.

If in Step 3 the personal data stored by subscriber 10 on the old SIM card have been saved, these can now be transferred to the new SIM card 8. The subscriber furthermore can now again be informed again with respect to the procedure to follow with the old card.

DRAWING LEGEND

1 Method step
2 Method step
3 Method step
4 Method step
5 Method step
6 Method step 6a, 6b
7 Billing Center (BC)
8 SIM card
9 Billing statement
10 Subscriber (terminal device)
11 Mobile communication network
12 SIM migration server
13 Home data base (HLR—home location register)

The invention claimed is:

1. Method for the simplified exchange of a SIM card by the subscribers of a digital mobile communication network, where a subscriber has at his disposal an old active SIM card and a new inactive SIM card for operation in a mobile terminal device, comprising the steps of utilizing the old active SIM card within a terminal device to activate a new SIM card (8) by communicating with a migration server and subsequently deactivating the old SIM card by carrying out a dialog with the subscriber (10) through a migration server (12) connected to the mobile communication network 11; and informing the subscriber, following activation of the new SIM card, that the old SIM card can be exchanged for the new SIM card in the mobile terminal device.

2. Method for the simplified exchange of a SIM card by the subscribers of a digital mobile communication network, where the subscriber has at his disposal an old active SIM card and a new inactive SIM card for operation in a mobile terminal device,
  comprising the steps of utilizing the old active SIM card to activate a new SIM card (8) and subsequently deactivating the old SIM card by carrying out a dialog with the subscriber (10) through a migration server (12) connected to the mobile connection network 11, wherein sending a message with given content from the mobile terminal device to the migration terminal (12) utilizes the old SIM card within the terminal device;
  activating the new SIM card (8) takes place through the migration server (12);
  the subscriber (10), following activation of the new SIM card, is informed that the new SIM card 8 can be exchanged for the old SIM card;
  exchanging the old SIM card (8) with the new SIM card in the mobile terminal device, and
  deactivating the old SIM card through the migration server (12) as soon as the subscriber logs in for the first time with the new SIM card (8) into the mobile communication network (11).

3. Method as claimed in claim 1, characterized in that the new SIM card (8) is only activated after its receipt has been confirmed with certainty by the subscriber.

4. Method as claimed in claim 1, characterized in that the message is an SMS or an e-mail message.

5. Method as claimed in claim 1, characterized in that the exchange of the SIM card (8) can take place at a point in time freely selectable by the subscriber.

6. Method as claimed in claim 1, characterized in that the migration server (12) queries person data of the subscriber residing on the old SIM card, intermediately stores them and, during the initial log-in with the new SIM card (8), transfers these onto it.

7. Method as claimed in claim 1, characterized in that the subscriber 10 receives information of a terminal device about the procedure to follow with the old SIM card.

* * * * *